Oct. 5, 1948.　　　B. SHINBERG ET AL　　　2,450,490
METHOD AND APPARATUS FOR MOLDING SHOE UPPERS
Filed Sept. 15, 1947　　　3 Sheets-Sheet 1
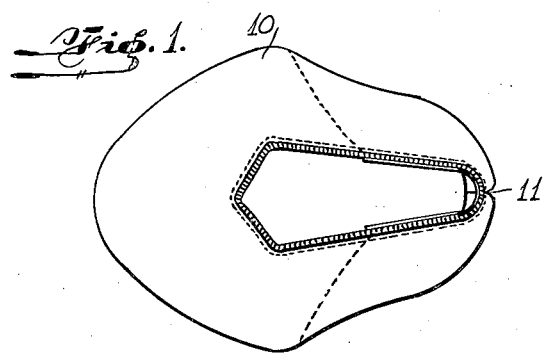
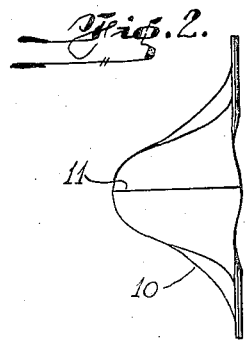
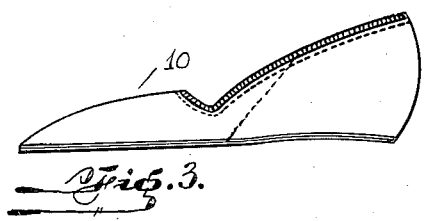
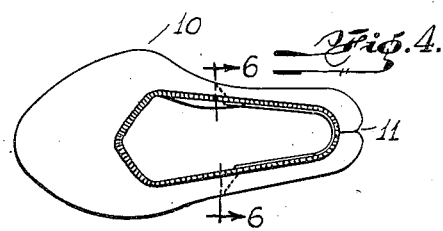
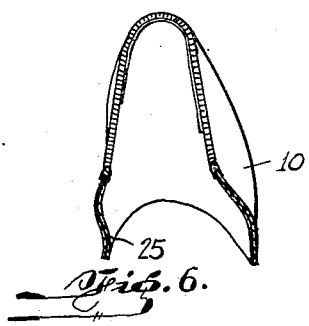
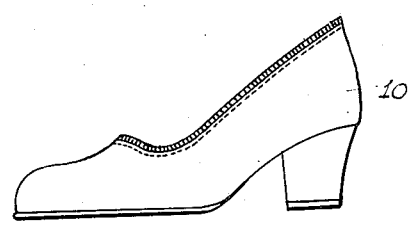
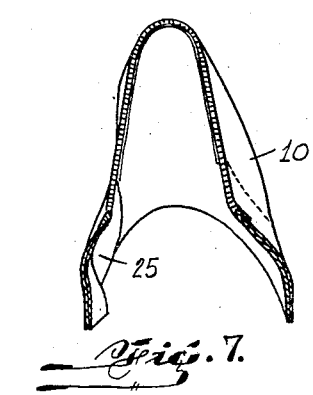
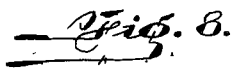
INVENTORS.
HYMEN SHRAGER.
BARNEY SHINBERG.
BY
ATTORNEY.

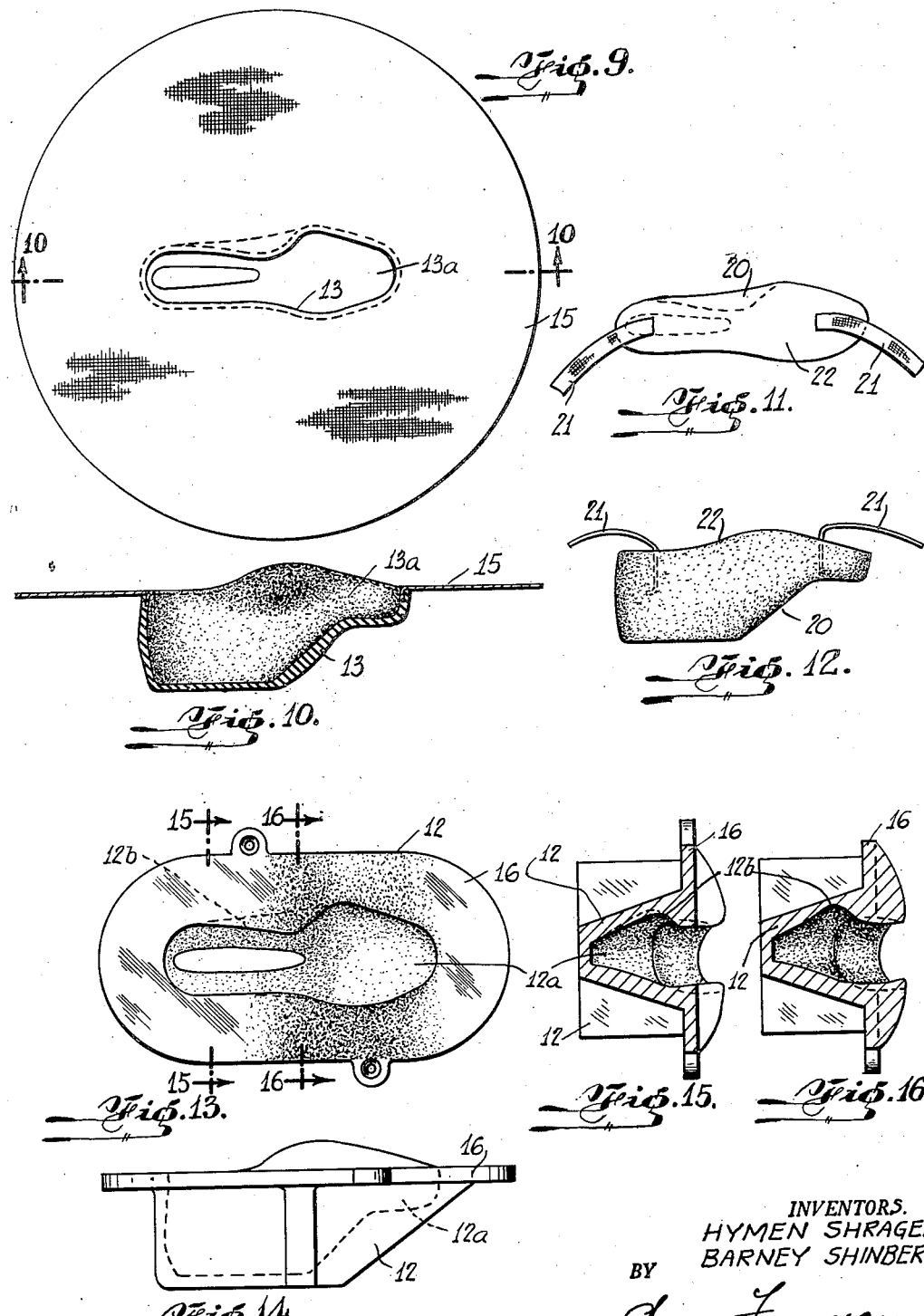

Oct. 5, 1948.  B. SHINBERG ET AL  2,450,490
METHOD AND APPARATUS FOR MOLDING SHOE UPPERS
Filed Sept. 15, 1947  3 Sheets-Sheet 3
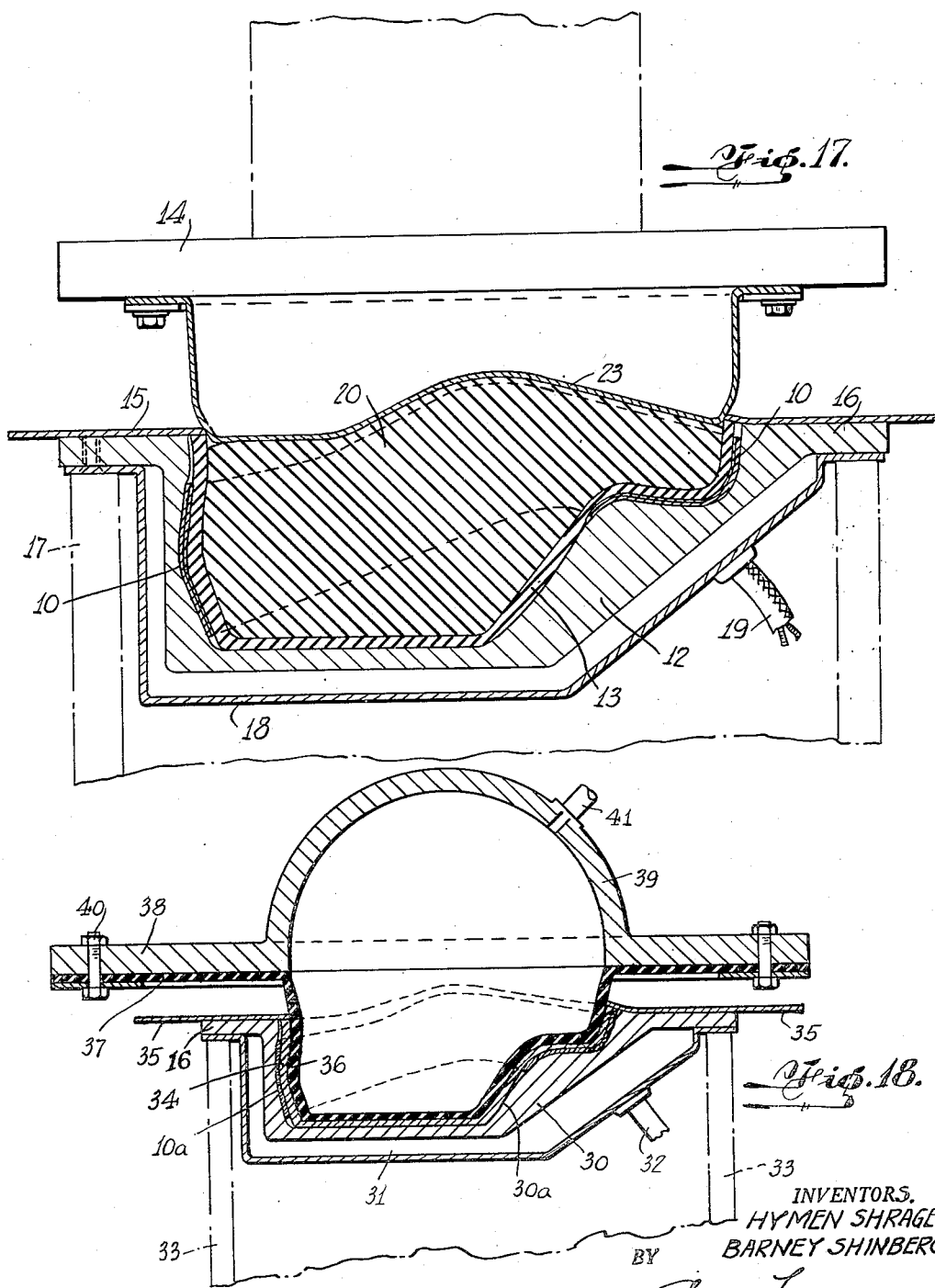
INVENTORS.
HYMEN SHRAGER
BARNEY SHINBERG.
BY
ATTORNEY.

Patented Oct. 5, 1948

2,450,490

UNITED STATES PATENT OFFICE 2,450,490

METHOD AND APPARATUS FOR MOLDING SHOE UPPERS

Barney Shinberg and Hymen Shrager, Westerly, R. I.

Application September 15, 1947, Serial No. 774,164

6 Claims. (Cl. 12—97)

This invention relates to new and useful improvements in methods and apparatus for making uppers for shoes and the like.

Heretofore, in making shoe uppers, it has been customary to stamp them out of sheets in blank form, sew the free rear ends together to form a rough blank upper, place the blank on a last of the desired shape, and then, by care and great skill, shape the upper onto the last.

This sort of operation has required a high degree of skill, and considerable time and care in order to achieve the proper results. The present invention has for an object to achieve the same results with much less time and without requiring great skill of the workmen.

In brief and general terms, the invention relates to the preforming or moulding of the shoe upper before it is placed on a last, thereby providing ease and accuracy in lasting, and resulting in more uniformly shaped shoes which retain their shape after being removed from the last.

The invention further concerns the method of placing a rough blank on a saddle shaped to the desired form, inserting the saddle in a desired die cavity, which die is heated, then applying pressure to set and shape the blank.

The saddle is hollow and preferably elastic, so as to permit it to readily pass narrow portions and undercuts in the cavity of the die. Similarly, a separate plug may be used, which is made of soft, resilient material which will resume its definite form to also allow it to be inserted within the saddle while in the die cavity. Also, the plunger which exerts pressure on the saddle and plug in the die may be provided with a cushioned lower face which exerts uniform pressure on the plug and adapts its shape to that of the surface of the plug with which it comes into contact. However, the plunger may be rigid since the plug is resilient. On the other hand, the so-called plug may be omitted and the plunger itself may serve both purposes, as will later become apparent.

Further features will appear from the following description setting forth the method and apparatus illustrated in the drawings.

The present preferred forms which the invention may assume are illustrated in the drawings, of which:

Fig. 1 is a plan view of the upper when the unformed blank or "flat" has been made and the free ends have been drawn together and sewed.

Fig. 2 is a rear end view of the blank.

Fig. 3 is a side view of the blank.

Fig. 4 is a plan view of the upper after it has been formed in the die.

Fig. 5 is a side view thereof.

Fig. 6 is a vertical cross section taken on the line 6—6 of Fig. 4.

Fig. 7 is a similar section taken on the line 7—7 of Fig. 5.

Fig. 8 is a side elevation of a finished shoe.

Fig. 9 is a plan view of the former saddle used in connection with the die.

Fig. 10 is a sectional view thereof, taken on line 10—10 of Fig. 9.

Fig. 11 is a plan view of the former plug used in association with the die and the saddle.

Fig. 12 is a side elevation thereof.

Fig. 13 is a plan view of the metal female die member.

Fig. 14 is a side elevation thereof.

Fig. 15 is a vertical cross section taken on the line 15—15 of Fig. 13.

Fig. 16 is a similar section taken on the line 16—16 of Fig. 13.

Fig. 17 is an enlarged longitudinal vertical section through the forming apparatus with the upper blank in place therein.

Fig. 18 is a view similar to Fig. 17, but showing a modified forming apparatus.

Referring now merely to the specific forms of the invention shown in the drawings, it is to be noted that, in making the shoe uppers, they are first cut out as a blank sheet in flat form and then the free ends of the blank or "flat," as they are called, are brought together to form the rear of the upper 10, and then are sewed along the line 11, as seen in Fig. 2. In this stage of the manufacture, the upper blank is unformed. In the ordinary process of manufacture, they would be placed by hand over a last and formed thereon in proper shape by a workman who has to be highly skilled to properly shape the shoe upper, and to turn the lower ends over under the edge of the last, and to adhere these under-turned edges to an inner sole. This step requires a high degree of skill and takes quite some time to properly achieve.

As is well known in the trade, a properly formed upper has curved inwardly sloped instep portions 25 which, to create a proper fit, must be carefully formed from the blank. In this method, as seen in Fig. 17, the upper blank is placed within a female die member 12 which has been made with its interior surface to the exact shape required to be produced in the upper placed therein. Preferably, the upper blank is placed in the die cavity after being disposed over a saddle element shown in Figs. 9, 10, and 17. The saddle member 13 is made of flexible material as, for instance, rubber, and is formed in the exact shape of the curvature of the inner die surface but when placed within the die member with the upper blank disposed thereon, as seen in Fig. 17, its outer surface lies against the surface of the die member especially when pressure is applied by a pressure member 14. The saddle is provided with a flange 15 in the form of a large disc which, while preferably made of canvas or duck or similar heavy fabric, might likewise be of the same material as the saddle proper.

Reference to Figs. 13 and 17 will show that the die member 12 has an ample flat flange 16 which enables it to be placed in association with a frame support 17, on which is disposed a hollow casing 18 containing suitable heating elements (not shown) operated through an electric cable 19 connected thereto. The flange 16 is shown in Fig. 17 as resting on the top of the casing or support 17.

When the saddle former 13 has the shoe upper blank 10 properly placed thereon, it is manually forced into the die cavity until the blank 10 snugly lies throughout against the surfaces 12a thereof with the blank disposed in proper position therein, as shown, and with the flange 15 disposed flat along the flange 16 of the die member. At this time, there is inserted into the hollow saddle form a plug member 20, which has been shaped similarly to the interior of the hollow saddle but is formed of resilient material such as rubber, and has been specially manufactured so as to be soft and pliable enough to be inserted into and removed from the saddle cavity in the die, in spite of the undercuts 12b necessarily formed in the die cavity. This plug 20 is then shoved into the cavity 13a on top of and within the saddle member, as shown in Fig. 17, and spreads out and holds the saddle material into close contact with the shoe upper within the die cavity. The plug is provided with suitable tabs 21 which may be gripped to lift the plug out of the die when the operation is completed.

A pressure member or plunger 14 is disposed above the die and, when the other parts are in the relative position shown in Fig. 17, will be forced down by suitable pressure-creating means (not shown) to force the plug firmly into the cavity so that it will spread out to tightly engage the entire inner surface of the saddle and press and hold it in position to force the shoe upper against the heated die. The lower face of the plunger 14 is provided with a dependent hollow rubber casing 23 which is filled with air or water (not shown), which enables the casing 23 to act as a cushion when the plunger 14 is depressed to exert uniform pressure upon the top 22 of the plug 20 and yet conform to the curvature of the upper face of the plug. Thus an even downward pressure is exerted at all times.

Instead of using a separate plunger and plug, the two may be conveniently combined as shown. In the modification illustrated in Fig. 18, there is shown in simplified construction, the female die casting 30 provided with the hollow form 30a. The die casting 30 is provided with a heating chamber 31, which may be electrically heated or otherwise heated, as by steam, hot water, etc., through the inlet 32. The die and heating chamber are supported as at 33. A shoe upper 10a is placed against the outer surface of the saddle former 34, which has a flange 35 similar to that already described with respect to Fig. 17. The saddle former 34 with the upper 10a placed thereon is now inserted into the hollow space 30a.

The pressure member or plunger in this instance, consists of the hollow flexible member 36, having a flange 37 which is in turn secured to the flange 38 of the pressure chamber 39, by means of bolts 40. The hollow flexible plunger member 36 has in general the contour of the shape of the hollow portion of the saddle 34. Inlet 41 may be used for entry of water or air into the hydraulic or pneumatic bag 36 constituting the plunger.

In the operation of the method and the handling of the apparatus, the shoe upper as prepared in Fig. 1, is placed by the workman over the saddle 13 or 34, and the saddle is then pushed into the die cavity with its flange 15 resting on the flange 16 of the die member 12 or 30, as shown in Figs. 17 and 18, the die being heated. The elasticity or flexibility of the saddle material now enables it thus to be inserted past the narrow portions of the die cavity and the undercuts therein and to assume a snug relation to the cavity after it is in position, since it has been made into the same curvature and shape.

The plug 20 (Fig. 17) is then inserted by hand into the hollow interior of the saddle and it, because also of its resiliency, can be pushed past the narrow portions and undercuts of the die into close proximity to the interior surface of the saddle. After the plug is in place, the plunger 14 is depressed upon the top of the plug and this pressure is maintained for sufficient period to set the shoe-upper blank into its desired shape within the heated die. The construction of the plunger will permit it to exert even pressure on the plug although the surface of the plug may be irregular.

In the modification shown in Fig. 18, after the saddle 34 is positioned as above described, the plunger 36 is then lowered into the cavity of the saddle 34 and fluid is entered through inlet 41 into the pressure chamber 39 to expand the plunger 36 and the pressure is maintained for a sufficient period to set the shoe-upper 10a into its desired shape within the heated die. After this moulding operation, the plunger is retracted, the plug and saddle removed, and the shoe upper taken off and a new one substituted, and the operation is repeated. As a result of this operation, the blank shown in Fig. 1 is transformed into the finished shoe upper shown in Fig. 5, ready for further treatments thereto resulting in the finished shoe shown in Fig. 8.

These methods are ones which obviously lend themselves to performance by any workman without a high degree of skill, and also considerably reduces the time required to complete the operation as compared to the ordinary methods now in use.

The above description relates to preforming shoe uppers that require a lasting operation, but it will be understood that if desired, the lasting operation on certain shoes, for instance on cheap shoes or slippers, may be omitted altogether and instead, the shoe upper as formed by the molding operation above described, may be used directly.

While the invention has been described in detail and with respect to present preferred forms which it may assume, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

Having thus described our invention, what we claim as new and desire to secure by Letters Patent, is:

1. A method of forming shoe uppers in preparation for lasting which comprises placing the upper blank on a hollow flexible last-shaped saddle which is open at the top, inserting the saddle and upper into a metal die cavity of a heated die, inserting into said hollow saddle a solid elastic last-shaped plug, and then subjecting the plug to pressure.

2. A device for forming shoe uppers comprising in combination a female die member having a shoe-shaped cavity, means for heating said die member, a hollow flexible last-shaped saddle as a male die member insertable into said cavity, and means to force the walls of said male die member against a shoe-upper blank being worked on between the dies.

3. A device for forming shoe uppers which comprises the combination of a female die member having a shoe-shaped cavity, and a flat flange along the top edge thereof, means for heating said die, a hollow flexible last-shaped saddle insertable as a male die member into said cavity, and a fabric flange connected to the top of the saddle and adapted to lie on top of the flange of the die when the saddle is inserted within the die cavity.

4. A device for forming shoe uppers which comprises a die having a shoe-shaped cavity, means for heating said die, a hollow flexible last-shaped saddle insertable as a male die member into said cavity, and a solid flexible last-shaped plug insertable into the hollow saddle when disposed within the die cavity, and means to apply pressure on said plug.

5. A device for forming shoe uppers which comprises a die having a shoe-shaped cavity, means for heating the die, a hollow flexible last-shaped saddle insertable into said cavity, said saddle being open at the top, a solid flexible plug insertable into the saddle when disposed within the die cavity, a plunger to exert pressure on said plug, said plunger having a flexible casing on its lower face, and being filled with fluid material to facilitate the distribution of substantially uniform pressure upon the plug and upon the walls of the saddle.

6. The combination in a device for forming shoe uppers, of a female die member having a shoe-shaped cavity, means for heating said die, a hollow flexible last-shaped saddle insertable into said cavity as a male die member, said saddle being open at the top, fluid pressure means insertable into said saddle when it is disposed within the die cavity to exert pressure substantially uniformly in all directions upon the walls of the saddle.

BARNEY SHINBERG.
HYMEN SHRAGER.

REFERENCES CITED

The following references are of record in the file of this patent:

UNITED STATES PATENTS

| Number | Name | Date |
|---|---|---|
| 1,131,873 | Strauss | Mar. 16, 1915 |
| 2,298,384 | Jalbert | Oct. 13, 1942 |